(12) United States Patent
Hooper et al.

(10) Patent No.: US 8,307,714 B1
(45) Date of Patent: Nov. 13, 2012

(54) DUAL PORT PRESSURE SENSOR

(75) Inventors: Stephen R. Hooper, Mesa, AZ (US);
William G. McDonald, Payson, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/151,404

(22) Filed: Jun. 2, 2011

(51) Int. Cl.
*G01L 7/00* (2006.01)

(52) U.S. Cl. ............................................. 73/756; 73/754

(58) Field of Classification Search ............. 73/700–756
See application file for complete search history.

(56) References Cited

U.S. PATENT DOCUMENTS

| | | | |
|---|---|---|---|
| 4,879,903 A * | 11/1989 | Ramsey et al. | 73/431 |
| 5,672,808 A | 9/1997 | Klauder et al. | |
| 5,691,480 A * | 11/1997 | Cook et al. | 73/756 |
| 5,834,638 A * | 11/1998 | Taylor et al. | 73/114.43 |
| 5,969,259 A * | 10/1999 | Cook et al. | 73/756 |
| 5,969,591 A | 10/1999 | Fung | |
| 6,148,673 A | 11/2000 | Brown | |
| 6,150,681 A | 11/2000 | Allen | |
| 7,162,927 B1 * | 1/2007 | Selvan et al. | 73/753 |
| 7,497,124 B2 | 3/2009 | Kuznia et al. | |
| 8,171,800 B1 * | 5/2012 | Chiou | 73/736 |
| 2011/0232389 A1 * | 9/2011 | Chiou et al. | 73/721 |
| 2012/0144923 A1 * | 6/2012 | Yahata | 73/754 |

* cited by examiner

*Primary Examiner* — Andre Allen
(74) *Attorney, Agent, or Firm* — James L. Clingan, Jr.

(57) ABSTRACT

A dual port pressure sensor has a lead frame having a flag having a first opening and a second opening. The lead frame has a flag having a first opening and a second opening. An encapsulant holds the lead frame. The encapsulant is over a top of the flag and a bottom of the flag is uncovered by the encapsulant. A first opening in the encapsulant is aligned with and larger than the first opening in the flag, and a second opening in the encapsulant is aligned with the second opening in the flag. A pressure sensor transducer is attached to the bottom of the flag and covers the first opening in the flag and provides an electrically detectable correlation to a pressure differential based on a first pressure received on its top side and a second pressure received on its bottom side. An integrated circuit is attached to the bottom of the flag and is electrically coupled to the pressure sensor. A lid forming an enclosure with the bottom of the flag. The pressure sensor transducer receives the first pressure through the first opening in the encapsulant and the first opening in the flag and the second pressure through the second opening in the encapsulant, the second opening in the flag, and the enclosure.

20 Claims, 4 Drawing Sheets

DUAL PORT PRESSURE SENSOR

CROSS-REFERENCE TO RELATED APPLICATIONS

This application is related to U.S. patent application Ser. No. 13/151,409, filed on even date, titled "METHOD OF MAKING A DUAL PORT PRESSURE SENSOR," naming Stephen R. Hooper and William G. McDonald as inventors, and assigned to the current assignee hereof.

BACKGROUND

1. Field

This disclosure relates generally to pressure sensors, and more specifically, to dual port pressure sensors.

2. Related Art

Pressure sensors have become important in a number of applications especially automotive applications. They are typically a combination of a transducer that responds to pressure and an integrated circuit (IC) that interprets that response to provide an electrical signal, analog or digital, that relates to the pressure. In dual port applications, there are two inlets to the transducer, and it is the differential pressure at those two inlets to which the transducer responds. There are a variety of factors such as how the actual combination of the transducer and IC are placed together and the relationship of the mounting to the two inlets. Also the resulting combination will often be mounted on a printed circuit board and how that mounting occurs can be important. For example, it may be important for the printed circuit board to have potting material applied to it. In such a case it is important that neither inlet be covered by the potting material. This may result in both inlets being on the top side of the combination and then creating issues as to how the transducer receives the differential pressure from the two inlets. Also, it is desirable for both the IC and the transducer to be as small as possible to reduce cost.

Accordingly, there is a need for a pressure sensor that improves upon one or more of the issues discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a pressure sensor has a flag and leads in which the flag has a pair of cavities and the leads extend to a bottom side of the pressure sensor for mounting. A first cavity is exposed to a first inlet, which is on a top side of the pressure sensor, on a top side of the flag. A pressure sensor transducer is mounted on the bottom side of the flag and covers the first cavity. A second inlet, which is on the top side of the pressure sensor extends to the second cavity from the top side of the flag. The second cavity is open to bottom side of the flag thus to the pressure sensor transducer so that the transducer is exposed to the first inlet and the second inlet. An integrated circuit is mounted to the bottom side of the flag and is coupled to the pressure sensor transducer. This is better understood by reference to the drawings and the following description.

Figure 1:
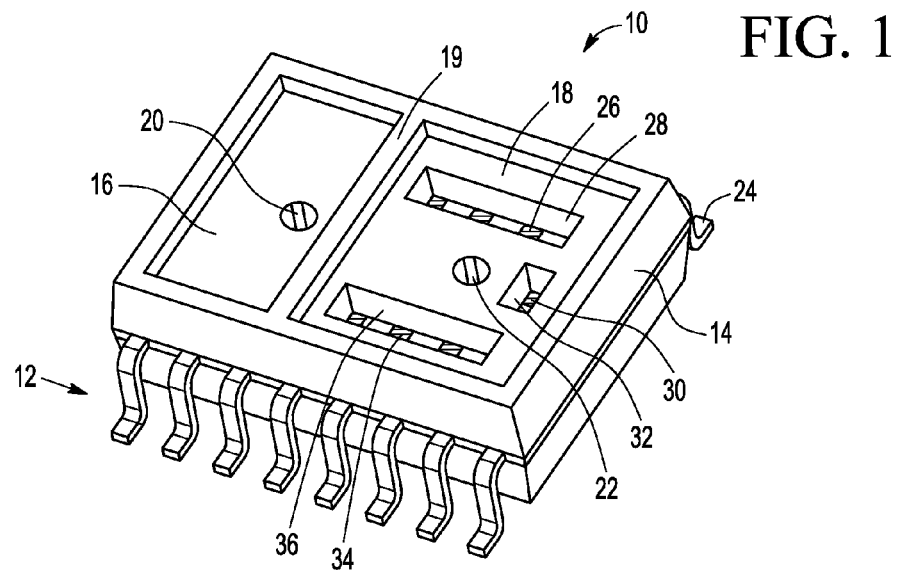
FIG. 1 is an isometric view of a pressure sensor structure showing a top and two sides at a stage in processing according to an embodiment; . . . .

FIG. 1 shows a top and two sides of a pressure sensor structure 10 having a lead frame 12, an encapsulant 14, a cavity 16 in the top, a cavity 18 in the top, a wall 19 between cavities 16 and 18, an opening 20 in cavity 16, and an opening 22 in cavity 18. Lead frame 12 includes a plurality of leads in which lead 24 is shown as a representative lead. Lead frame 12 also includes fingers 26, 30, and 34 at bottoms of cavities 28, 32, and 36, respectively. Cavities 28, 32, and 36 are formed within cavity 18. Encapsulant 14 may be a molded plastic commonly used in packaging integrated circuits.

Figure 2:
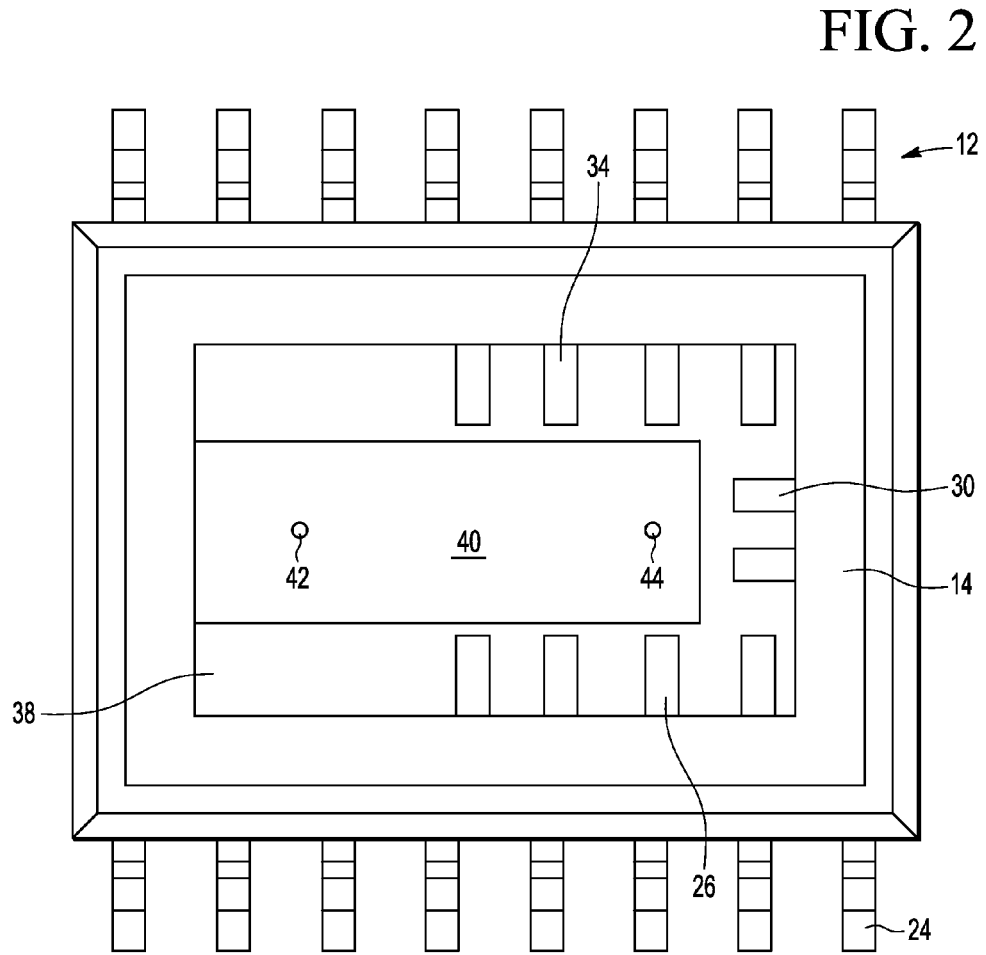
FIG. 2 is a bottom view of the pressure sensor structure of FIG. 1.

Shown in FIG. 2 is a bottom of pressure sensor structure 10 of FIG. 1. Shown in FIG. 2 is a cavity 38 in encapsulant; bottom sides of lead 24, fingers 26, 30, and 34; a flag 40 that is part of lead frame 12, and openings 42 and 44 in flag 40. Lead frame 12 is encapsulated according to a mold around lead frame 12 that results in pressure sensor structure 10 as shown in FIGS. 1 and 2. Encapsulant 14 is molded to expose a portion of flag 40 and portions of the fingers which are represented by fingers 26, 30, and 34. Lead frame 12 is partially covered by encapsulant 14 which is typical of a lead frame that has been encapsulated according to a mold. At least prior to lead frame 12 being part of a structure of a plurality of lead frames, and at the time of encapsulation, the plurality of leads of which lead 24 is an example; fingers 26, 30, and 34; and flag 40 are physically connected together. After encapsulation this connection may be severed with the result shown in FIGS. 1 and 2. A lead frame is considered to be a metallic structure, that at least prior to encapsulation, has leads, fingers, and a flag that are physically connected together and are metallic. At least some of the leads are for forming electrical connection outside of the encapsulant. The flag is for mounting one or more integrated circuits and possibly other devices. The fingers are for connecting to one or more of the devices mounted on the flag. The fingers are for being connected to the leads and to one or more devices on the flag. The fingers may be a continuous part of the leads but shaped for the purpose of connecting to one or more devices on the flag. In this example, the fingers are for being wire bonded. Cavities 28, 32, and 36 in encapsulant 14 shown in FIG. 1 arise from the mold holding lead frame 12 in place during encapsulation. The leads, such as lead 24, are bent down toward the bottom of pressure sensor device 10. The leads do not necessarily have to be dual in-line as shown, but the leads are for mounting to a surface such that the bottom of pressure sensor structure 10 faces the surface. In that sense, the leads are on the bottom of pressure sensor structure 10.

Openings 42 and 44 are made smaller than openings 20 and 22 which is made possible by openings 42 and 44 being made in a metallic structure. Metallic in this case means that a major portion, at least 25 percent, of the structure is a metal. Copper is particularly effective as the metal for lead frames such as lead frame 12. The metal content may even be 100 percent for copper. Opening 20 is aligned to opening 42. Opening 22 is aligned to opening 44. By one method, openings 42 and 44 may be made during the forming of the lead frame and even if subsequently formed would preferably be formed before encapsulation. Openings 20 and 22 may be formed as part of the process of encapsulation as defined by the mold. On the other hand, the encapsulation may be performed before these openings are formed. In such case, encapsulant 14 may be formed and then drilled or etched out to form openings 20 and 22. Openings 42 and 44 may, as an alternative, be drilled after encapsulation. Openings 42 and 44 may also be formed before the encapsulation process even for the case where openings 20 and 22 are not formed by the mold. In such case, encapsulant may need to be removed from openings 42 and 44 or one alternative may be to place removable plugs in openings 42 and 44 prior to encapsulation. Encapsulant materials do not lend themselves to making as small of a diameter of a hole as do metallic materials, at least not in a cost effective manner. In this example, when one opening is described as larger than another opening, it means that the larger opening is wider, which in the case of comparing cylindrical openings, means the larger opening has a greater diameter. Pressure sensor structure 10 thus arises from encapsulating a lead frame in which the flag, flag 40, has openings that may be formed before in the case of the flag, during in the case of the encapsulant, or after in the case of either the flag or the encapsulant. The opening in the flag to which the transducer is attached should be sufficiently small to be covered by the transducer but this requirement does not necessarily apply to the other opening in the flag which may be larger than the opening covered by the transducer.

Figure 3:
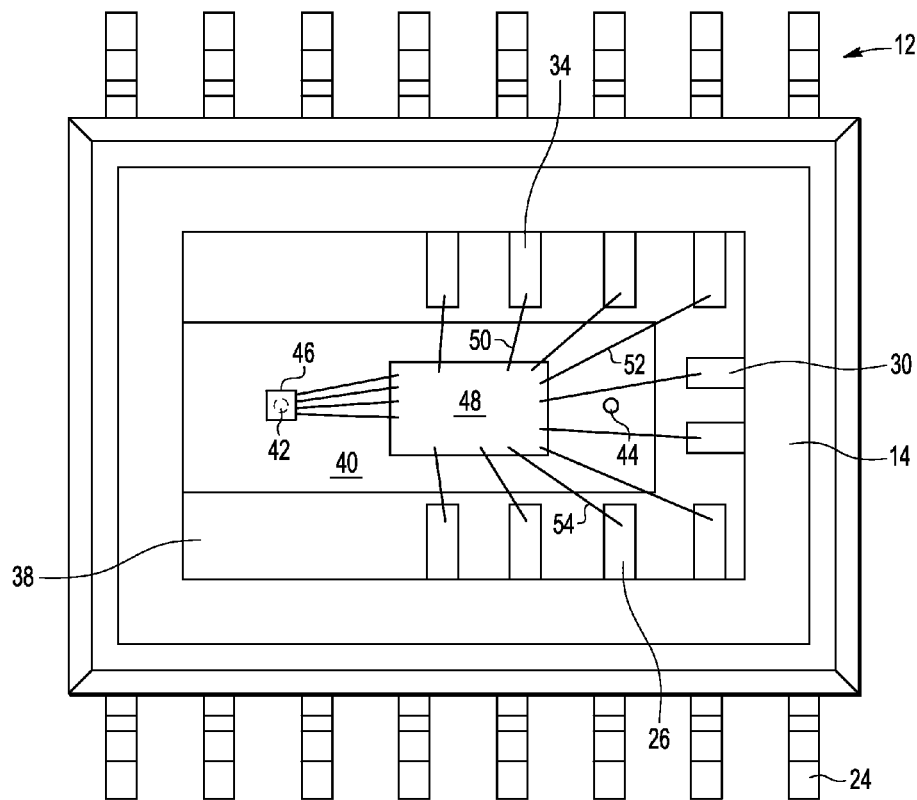
FIG. 3 is a bottom view of pressure sensor structure of FIGS. 1 and 2 at a subsequent stage in processing.

Shown in FIG. 3 is pressure sensor structure 10 after attaching a pressure sensor transducer 46 to flag 40 over opening 42 and an integrated circuit 48 attached to flag 40. Pressure sensor transducer 46 may not be sufficiently large to cover opening 20. The area of pressure sensor transducer 46 may be as much as the cross section of opening 20, but because it has a different shape than the cross section of opening 20, it may not be sufficiently large to cover opening 20. Pressure sensor transducer 46 receives pressure on its bottom and its top and provides a resistance based on the pressure differential between the top and bottom. Thus pressure sensor transducer 46 has one side, which will be referenced as its top side to be consistent with the usage of "top" and "bottom" relative to pressure sensor structure 10, facing opening 42. The top of transducer 46 thus receives one pressure through opening 42. The bottom of transducer 46 receives the other pressure in the more open area in cavity 38 through opening 44. Cavity 38 will be sealed in a subsequent step. Integrated circuit 48 is connected to the fingers, such as fingers 26, 30, and 34, and to transducer 46 by wirebonding. This is a particularly cost effective manner of providing electrical connections. Exemplary wirebonds are wirebonds 50, 52, and 54 connected to fingers 34, 30, and 26, respectively. With the fingers electrically connected to leads, integrated circuit 48 is electrically connected to the leads. Other techniques for electrically connecting transducer 46 to integrated circuit 48 and for electrically connecting integrated circuit 48 to the leads may be used. Integrated circuit 48 processes the resistance information from transducer 46 to provide pressure information, in electrical form, on the leads. An effective way to use the resistance information is by using a bridge. A portion of the bridge may be on transducer 46. Another effective transducer for sensing pressure is one that provides a capacitance in relation to a pressure differential.

Figure 4:
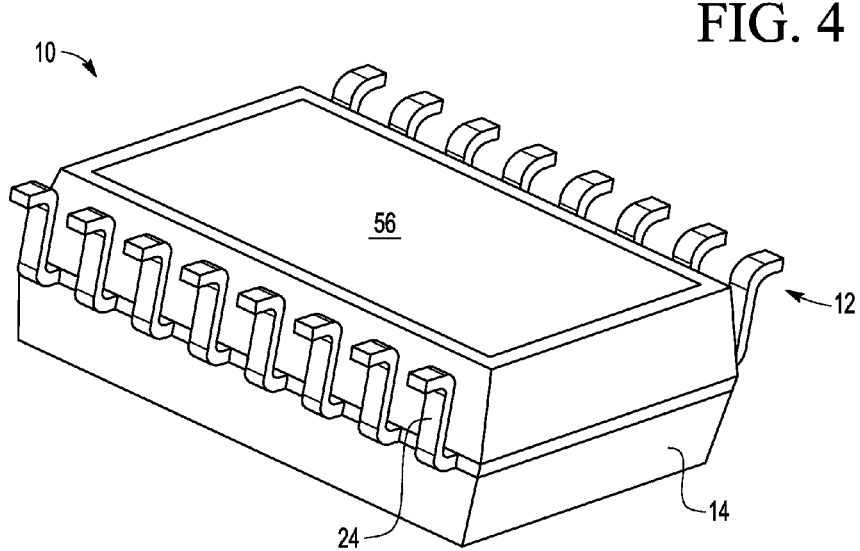
FIG. 4 is a bottom view of the pressure sensor structure of FIG. 3 at a subsequent stage in processing.

Shown in FIG. 4 is pressure sensor structure 10 after a lid 56 has been placed on the bottom of pressure sensor structure 10. Lid 56 is sealed so that the pressure of cavity 38 is established through opening 44. Lid 56 results in an enclosure where one of the two pressures will be applied to transducer 46. With transducer 46 in a cavity, it is convenient to from the enclosure simply by applying a flat lid over the cavity. A possible alternative may be for transducer 46 and integrated circuit 48 to not be in a cavity, lid 56 to be shaped so as to seal an enclosure around transducer 46, integrated circuit 48, and opening 42. The use of cavity 38 currently has benefits in that it is convenient to form with currently used encapsulant material which also holds the flag, leads, and fingers in place.

Figure 5:
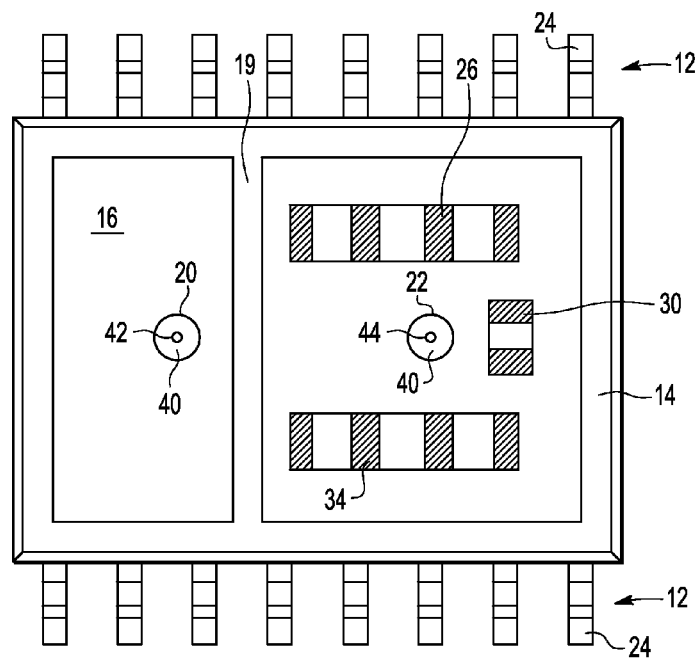
FIG. 5 is a top view of the pressure sensor structure of FIGS. 1 and 2.

Shown in FIG. 5 is pressure sensor structure 10 from a top view which is the same as that shown in FIG. 2 except that more detail is available from a direct top view such as portions of flag 40 through openings 20 and 22 are visible as are openings 42 and 44 in flag 40. Also more of the fingers are visible. This is prior to attaching transducer 46.

Figure 6:
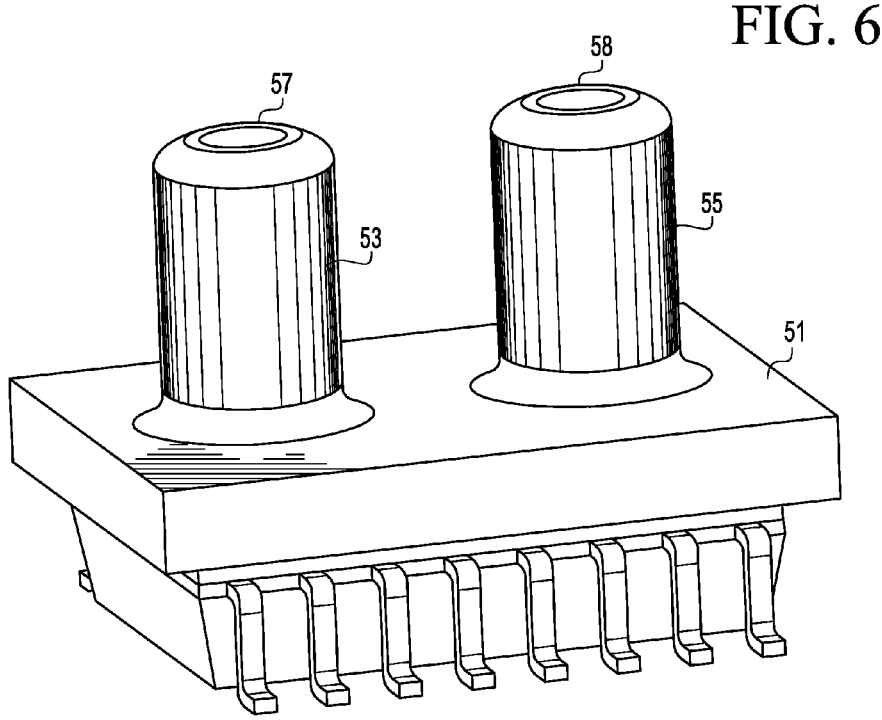
FIG. 6 is an isometric view of the pressure sensor structure as a completed pressure sensor showing a top and two sides.

Shown in FIG. 6 is pressure sensor structure 10 after attaching a dual port 51 to pressure sensor structure 10 as shown in FIG. 5. This may be performed before or after transducer 46 and integrated circuit 48 have been attached and before or after lid 56 has been attached. Dual port 51 has a port 53 with an opening 57 that extends to cavity 18 and a port 55 that has an opening 58 that extends to cavity 16. Dual port 51 is sealed using barrier 19 to ensure that opening 57 and openings 58 are kept separate and the only access to cavity 16 through dual port 51 is through the top of opening 58 and the only access to cavity 18 through dual port 51 is through the top of opening 57. Cavities make it convenient for providing a seal for dual port 51, but an alternative may be to not form cavities 16 and 18 but simply rely on dual port 51 sealing to a flat surface on the top of the encapsulant to prevent the pressure differential applied to openings 57 and 58 from being compromised.

Figure 7:
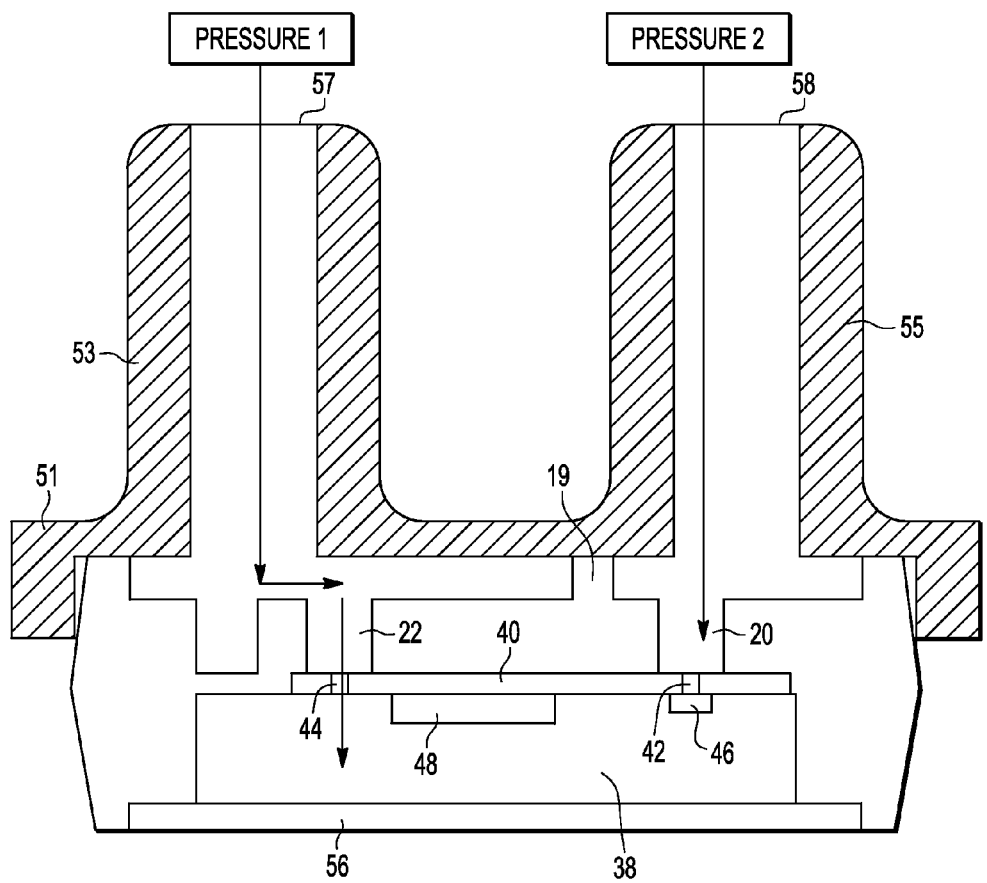
FIG. 7 is a cross section of the pressure sensor structure of FIG. 6.

Shown in FIG. 7 is a cross section of pressure sensor structure 10 as a completed dual port pressure sensor. This shows dual port 51 sealed to tops of sidewalls, including barrier 19, that define cavities 16 and 18. Also shown is the path of pressure from opening 57 to cavity to 18, to opening 22, to opening 44, to cavity 38, and thus to the bottom side of transducer 46. Similarly, a pressure path from opening 58 to cavity 16, to opening 20, to opening 42, and thus to the top side of transducer 46, is shown. Dual port 51 is shown as a unitary structure, but it may be achieved using multiple structures. For example, a different unit could be used for each port so that different structures would be used for connecting to cavities 16 and 18 but the group of multiple structures that achieve the dual port function could still be referenced as a dual port. In either case, one port is sealed to one cavity and the other port is sealed to the other cavity so that a pressure differential can be sustained between the two cavities.

The result is an efficient use of packaging technology that includes using openings in a flag to achieve a dual port pressure sensor in which both ports are on the top side of the dual port pressure sensor.

By now it should be appreciated that there has been provided A dual port pressure sensor. The dual port sensor includes a lead frame including a flag, leads, and fingers in which a first opening extends through the flag and a second opening extends through the flag and the leads are for providing external connections at a bottom side of the dual port pressure sensor. The dual port sensor further includes an encapsulant around portions of the flag, leads, and fingers in which the encapsulant includes a bottom cavity on a bottom side of the encapsulant exposing a bottom surface of the flag and bottom portions of the fingers; a first top cavity on a top side of the encapsulant; a first opening within the first top cavity aligned to the first opening in the flag and being larger than the first opening in the flag; a second top cavity on the top side of the encapsulant; and a second opening within the second top cavity aligned to the second opening in the flag and being larger than the second opening in the flag. The dual port sensor further includes a dual port on the top side of the dual port pressure sensor attached to the first cavity and second cavity. The dual port sensor further includes a pressure sensor transducer attached to the bottom of the flag and covering the first opening in the flag. The dual port sensor further includes an integrated circuit attached to the bottom of the flag, spaced from the second opening in the flag, and electrically coupled to the fingers and the pressure sensor transducer. The dual port sensor further includes a cap sealing the bottom cavity on the bottom side of the dual port pressure sensor. The dual port sensor may have a further characterization by which. The dual port sensor may have a further characterization by which the leads extend laterally externally from the encapsulant and downward toward the bottom of the encapsulant. The dual port sensor may have a further characterization by which the integrated circuit is an application specific integrated circuit. The dual port sensor may have a further characterization by which the dual port comprises a unitary body. The dual port sensor may have a further characterization by which the dual port comprises a first port connected to the encapsulant over the first top cavity and a second port connected to the encapsulant over the second top cavity. The dual port sensor may have a further characterization by which the integrated circuit is connected to the pressure sensor transducer by a first plurality of wirebonds. The dual port sensor may have a further characterization by which the integrated circuit is connected to the leads by a second plurality of wirebonds. The dual port sensor may have a further characterization by which the leads are dual in-line. The dual port sensor may have a further characterization by which pressure sensor transducer is a resistor bridge type. The dual port sensor may have a further characterization by which the pressure sensor transducer is not sufficiently large to cover the first opening within the first top cavity.

Described also is a dual port pressure sensor having an encapsulant covering portions of a lead frame, wherein the lead frame comprises leads, fingers, and a flag in which the flag has a first opening through the flag and a second opening through the flag; the leads are connected to the fingers; the leads extend out from the encapsulant and are for connecting to a surface on a bottom side of the encapsulant; the encapsulant has a first cavity with a first opening aligned to the first opening in the flag; the encapsulant has a second cavity with a second opening aligned to the second opening in the flag; and the first and second cavities are over a top of the flag. The dual port pressure sensor further includes a pressure sensor transducer attached to a bottom of the flag and covering the first opening in the flag. The dual port pressure sensor further includes an integrated circuit attached to the bottom of the flag, spaced from the second opening in the flag, and electrically connected to the pressure sensor transducer and the fingers. The dual port pressure sensor may have a further characterization by which the flag and the leads are in a third cavity and the third cavity is on a bottom of the encapsulant, further comprising a lid covering the third cavity. The dual port pressure sensor may have a further characterization by which the first opening in the first cavity is larger than the first opening in the flag, and the pressure sensor transducer is not sufficiently large to cover the first opening in the first cavity. The dual port pressure sensor may further include a dual port attached to a top of the encapsulant, wherein the dual port has a first port sealed to the first cavity and a second port sealed to the second cavity so that a pressure differential can be sustained between the first cavity and the second cavity. The dual port pressure sensor may have a characterization by which a differential in pressure between the first port and the second port is coupled to the pressure sensor transducer in which a first pressure is through the first cavity, through the first opening in the first cavity, and through the first opening in the flag to a top side of the pressure sensor transducer, and a second pressure is through the second cavity, through the second opening in the second cavity, through the second opening in the flag, through the third cavity to a bottom side of the pressure sensor transducer.

Also described is a dual port pressure sensor including a a lead frame having a flag having a first opening and a second opening. The dual port pressure sensor further includes an encapsulant holding the lead frame in which the encapsulant is over a top of the flag and a bottom of the flag is uncovered by the encapsulant, wherein a first opening in the encapsulant is aligned with and larger than the first opening in the flag and a second opening in the encapsulant aligned with the second opening in the flag. The dual port pressure sensor further includes a pressure sensor transducer attached to the bottom of the flag, covering the first opening in the flag, and providing an electrically detectable correlation to a pressure differential based on a first pressure received on its top side and a second pressure received on its bottom side. The dual port pressure sensor further includes an integrated circuit attached to the bottom of the flag and electrically coupled to the pressure sensor. The dual port pressure sensor further includes a lid forming an enclosure with the bottom of the flag. The dual port pressure sensor has a characterization by which the pressure sensor transducer receives the first pressure through the first opening in the encapsulant and the first opening in the flag and the second pressure through the second opening in the encapsulant, the second opening in the flag, and the enclosure. The dual port pressure sensor may have a further characterization by which the encapsulant has a first cavity around the first opening in the encapsulant and a second cavity around the second opening in the encapsulant. The dual port pressure sensor may further include a dual port having a first opening over the first opening in the encapsulant and a second opening over the second opening of the encapsulant and sealed to the encapsulant to keep the first pressure and the second pressure separate. The dual port pressure sensor may have a further characterization by which the flag is within a bottom cavity and the lid covers the bottom cavity to form the enclosure. The dual port pressure sensor may have a further characterization by which the first opening is formed within a first top cavity, the second opening is formed within a second top cavity, the first and second cavities share a common wall that functions as a barrier to keep the first and second pressures separate.

Although the invention is described herein with reference to specific embodiments, various modifications and changes can be made without departing from the scope of the present invention as set forth in the claims below. For example, the combination of an integrated circuit and transducer have been explained solely for use as a pressure sensor so that the integrated circuit is application specific (an ASIC), but the finished packaged device may be more than just a pressure sensor such as an engine controller and have far more leads than that shown. In such case the pressure information may be used by the integrated circuit and not be required to be supplied externally to the packaged device. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A dual port pressure sensor, comprising:
   a lead frame including a flag, leads, and fingers, wherein:
      a first opening extends through the flag and a second opening extends through the flag; and
      the leads are for providing external connections at a bottom side of the dual port pressure sensor;
   an encapsulant around portions of the flag, leads, and fingers, wherein the encapsulant has:
      a bottom cavity on a bottom side of the encapsulant exposing a bottom surface of the flag and bottom portions of the fingers;
      a first top cavity on a top side of the encapsulant;
      a first opening within the first top cavity aligned to the first opening in the flag and being larger than the first opening in the flag;
      a second top cavity on the top side of the encapsulant;
      a second opening within the second top cavity aligned to the second opening in the flag and being larger than the second opening in the flag;
   a dual port on the top side of the dual port pressure sensor attached to the first cavity and second cavity;
   a pressure sensor transducer attached to the bottom of the flag and covering the first opening in the flag;
   an integrated circuit attached to the bottom of the flag, spaced from the second opening in the flag, and electrically coupled to the fingers and the pressure sensor transducer; and
   a cap sealing the bottom cavity on the bottom side of the dual port pressure sensor.

2. The dual port pressure sensor of claim 1 wherein the leads extend laterally externally from the encapsulant and downward toward the bottom of the encapsulant.

3. The dual port pressure sensor of claim 1 wherein the integrated circuit is an application specific integrated circuit.

4. The dual port pressure sensor of claim 1, wherein the dual port comprises a unitary body.

5. The dual port pressure sensor of claim 1, wherein the dual port comprises a first port connected to the encapsulant over the first top cavity and a second port connected to the encapsulant over the second top cavity.

6. The dual port pressure sensor of claim 1, wherein the integrated circuit is connected to the pressure sensor transducer by a first plurality of wirebonds.

7. The dual port pressure sensor of claim 6, wherein the integrated circuit is connected to the leads by a second plurality of wirebonds.

8. The dual port sensor of claim 1, wherein the leads are dual in-line.

9. The dual port sensor of claim 1, wherein the pressure sensor transducer is a resistor bridge type.

10. The dual port sensor of claim 1, wherein the pressure sensor transducer is not sufficiently large to cover the first opening within the first top cavity.

11. A dual port pressure sensor, comprising:
   an encapsulant covering portions of a lead frame, wherein the lead frame comprises leads, fingers, and a flag wherein:
      the flag has a first opening through the flag and a second opening through the flag;
      the leads are connected to the fingers;
      the leads extend out from the encapsulant and are for connecting to a surface on a bottom side of the encapsulant;
      the encapsulant has a first cavity with a first opening aligned to the first opening in the flag;
      the encapsulant has a second cavity with a second opening aligned to the second opening in the flag;
      the first and second cavities are over a top of the flag;
   a pressure sensor transducer attached to a bottom of the flag and covering the first opening in the flag;
   an integrated circuit attached to the bottom of the flag, spaced from the second opening in the flag, and electrically connected to the pressure sensor transducer and the fingers.

12. The dual port pressure sensor of claim 11, wherein the flag and the leads are in a third cavity and the third cavity is on a bottom of the encapsulant, further comprising a lid covering the third cavity.

13. The dual port sensor of claim 12, wherein the first opening in the first cavity is larger than the first opening in the flag, and the pressure sensor transducer is not sufficiently large to cover the first opening in the first cavity.

14. The dual port sensor of claim 13, further comprising a dual port attached to a top of the encapsulant, wherein the dual port has a first port sealed to the first cavity and a second port sealed to the second cavity so that a pressure differential can be sustained between the first cavity and the second cavity.

15. The dual port sensor of claim 14, whereby a differential in pressure between the first port and the second port is coupled to the pressure sensor transducer in which a first pressure is through the first cavity, through the first opening in the first cavity, and through the first opening in the flag to a top side of the pressure sensor transducer, and a second pressure is through the second cavity, through the second opening in the second cavity, through the second opening in the flag, through the third cavity to a bottom side of the pressure sensor transducer.

16. A dual port pressure sensor, comprising:
   a lead frame having a flag having a first opening and a second opening;
   an encapsulant holding the lead frame in which the encapsulant is over a top of the flag and a bottom of the flag is uncovered by the encapsulant, wherein a first opening in the encapsulant is aligned with and larger than the first opening in the flag and a second opening in the encapsulant aligned with the second opening in the flag;
   a pressure sensor transducer attached to the bottom of the flag, covering the first opening in the flag, and providing an electrically detectable correlation to a pressure differential based on a first pressure received on its top side and a second pressure received on its bottom side;
   an integrated circuit attached to the bottom of the flag and electrically coupled to the pressure sensor; and
   a lid forming an enclosure with the bottom of the flag;
   whereby the pressure sensor transducer receives the first pressure through the first opening in the encapsulant and the first opening in the flag and the second pressure through the second opening in the encapsulant, the second opening in the flag, and the enclosure.

17. The dual port pressure sensor of claim 16, wherein the encapsulant has a first cavity around the first opening in the encapsulant and a second cavity around the second opening in the encapsulant.

18. The dual port pressure sensor of claim 16, further comprising a dual port having a first opening over the first opening in the encapsulant and a second opening over the second opening of the encapsulant and sealed to the encapsulant to keep the first pressure and the second pressure separate.

19. The dual port pressure sensor of claim 18, wherein the flag is within a bottom cavity and the lid covers the bottom cavity to form the enclosure.

20. The dual port pressure sensor of claim 19, wherein the first opening is formed within a first top cavity, the second opening is formed within a second top cavity, the first and second cavities share a common wall that functions as a barrier to keep the first and second pressures separate.

* * * * *